(12) United States Patent
Chen

(10) Patent No.: US 7,896,587 B1
(45) Date of Patent: Mar. 1, 2011

(54) DRILLING TOOL LOCATOR HAVING COOLING EFFECT

(76) Inventor: Lung-Chih Chen, Taichung County (TW)

( * ) Notice: Subject to any disclaimer, the term of this patent is extended or adjusted under 35 U.S.C. 154(b) by 1128 days.

(21) Appl. No.: 11/605,058

(22) Filed: Nov. 28, 2006

(51) Int. Cl.
*B23B 51/06* (2006.01)
*B23B 49/02* (2006.01)

(52) U.S. Cl. ..................................... 408/56
(58) Field of Classification Search .................. 408/56, 408/72 R, 115 B, 115 R, 241 G; *B23B 47/28, B23B 49/02, 51/06*
See application file for complete search history.

(56) References Cited

U.S. PATENT DOCUMENTS

| | | | | |
|---|---|---|---|---|
| 994,430 A * | 6/1911 | Tunks | ................. | 408/56 |
| 1,994,516 A * | 3/1935 | Hawn | ................. | 408/56 |
| 2,140,901 A * | 12/1938 | Etzenhouser et al. | ................. | 408/56 |
| 2,491,635 A * | 12/1949 | Allen, Jr. | ................. | 408/56 |
| 2,510,203 A * | 6/1950 | Andreasson | ................. | 408/56 |
| 2,522,400 A * | 9/1950 | Polkosnik | ................. | 408/104 |
| 2,582,667 A * | 1/1952 | Allen, Jr. | ................. | 408/56 |
| 2,680,435 A * | 6/1954 | Gonzalez | ................. | 408/56 |
| 2,870,993 A * | 1/1959 | Jahnke | ................. | 175/209 |
| 3,351,143 A * | 11/1967 | Seibold et al. | ................. | 175/209 |
| 3,775,020 A * | 11/1973 | Stoutenberg | ................. | 408/115 R |
| 3,874,808 A * | 4/1975 | Zaccardelli et al. | ................. | 408/1 R |
| 3,907,452 A * | 9/1975 | Tripp | ................. | 408/56 |
| 4,097,176 A * | 6/1978 | Wanner et al. | ................. | 408/56 |
| 4,475,853 A * | 10/1984 | Morgan | ................. | 409/137 |
| 4,738,009 A * | 4/1988 | Down et al. | ................. | 29/33 M |
| 5,033,917 A * | 7/1991 | McGlasson et al. | ................. | 408/67 |
| 5,415,502 A * | 5/1995 | Dahlin | ................. | 408/72 B |
| 7,703,552 B2 * | 4/2010 | Katagiri | ................. | 175/209 |
| 2008/0206004 A1* | 8/2008 | Giannetti | ................. | 408/56 |
| 2009/0092454 A1* | 4/2009 | Chen | ................. | 408/56 |
| 2009/0214307 A1* | 8/2009 | Nguyen | ................. | 408/56 |

FOREIGN PATENT DOCUMENTS

| | | | |
|---|---|---|---|
| DE | 10024724 A1 * | 11/2001 | |
| JP | 63016910 A * | 1/1988 | |
| JP | 06179108 A * | 6/1994 | |

* cited by examiner

*Primary Examiner*—Eric A Gates
(74) *Attorney, Agent, or Firm*—Alan Kamrath; Kamrath & Associates PA

(57) ABSTRACT

A locator for a drilling tool includes a main body having at least one locating hole, an inlet connector mounted on the main body and connected to the locating hole, and an inlet pipe having a first end connected to the inlet connector and a second end connected to a container. Thus, the cooling agent of the container is injected outwardly to pass through the inlet pipe and the inlet connector into the locating hole to provide a cooling effect to the drilling tool. In addition, the locator performs the cooling work automatically, so that the operator needs not to perform the drilling work by his one hand and to perform the cooling work by his other hand, thereby facilitating the operator operating the locator and protecting the operator's safety.

12 Claims, 6 Drawing Sheets

DRILLING TOOL LOCATOR HAVING COOLING EFFECT

BACKGROUND OF THE INVENTION

1. Field of the Invention

The present invention relates to a locator and, more particularly, to a locator for a drilling tool.

2. Description of the Related Art

A conventional drilling tool comprises a drill bit that is rotated at a high speed to drill a hole in a workpiece. Thus, a high temperature is produced during the drilling process due to a friction between the drill bit and the workpiece, so that the operator has to prepare a bottle containing a cooling agent which is filled into the hole between the drill bit and the workpiece so as to provide a cooling effect. However, the operator needs to operate the drill tool by his one hand and to hold the bottle by his other hand, thereby causing inconvenience to the operator, and thereby causing danger to the operator.

BRIEF SUMMARY OF THE INVENTION

In accordance with the present invention, there is provided a locator, comprising a main body having a first side formed with at least one locating hole, an inlet connector mounted on the main body and connected to the locating hole of the main body, and an inlet pipe having a first end connected to the inlet connector and a second end connected to a container.

The primary objective of the present invention is to provide a drilling tool locator having cooling effect.

Another objective of the present invention is to provide a locator for a drilling tool, wherein the cooling agent of the container is injected outwardly to pass through the inlet pipe and the inlet connector into the locating hole of the main body to provide a cooling effect to the drill bit of the drilling tool automatically.

A further objective of the present invention is to provide a locator for a drilling tool, wherein the locator performs the cooling work automatically, so that the operator needs not to perform the drilling work by his one hand and to perform the cooling work by his other hand, thereby facilitating the operator operating the locator and protecting the operator's safety.

A further objective of the present invention is to provide a locator for a drilling tool, wherein the locator can locate the drill bit of the drilling tool and perform the cooling work simultaneously, thereby facilitating the operator performing the drilling work.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
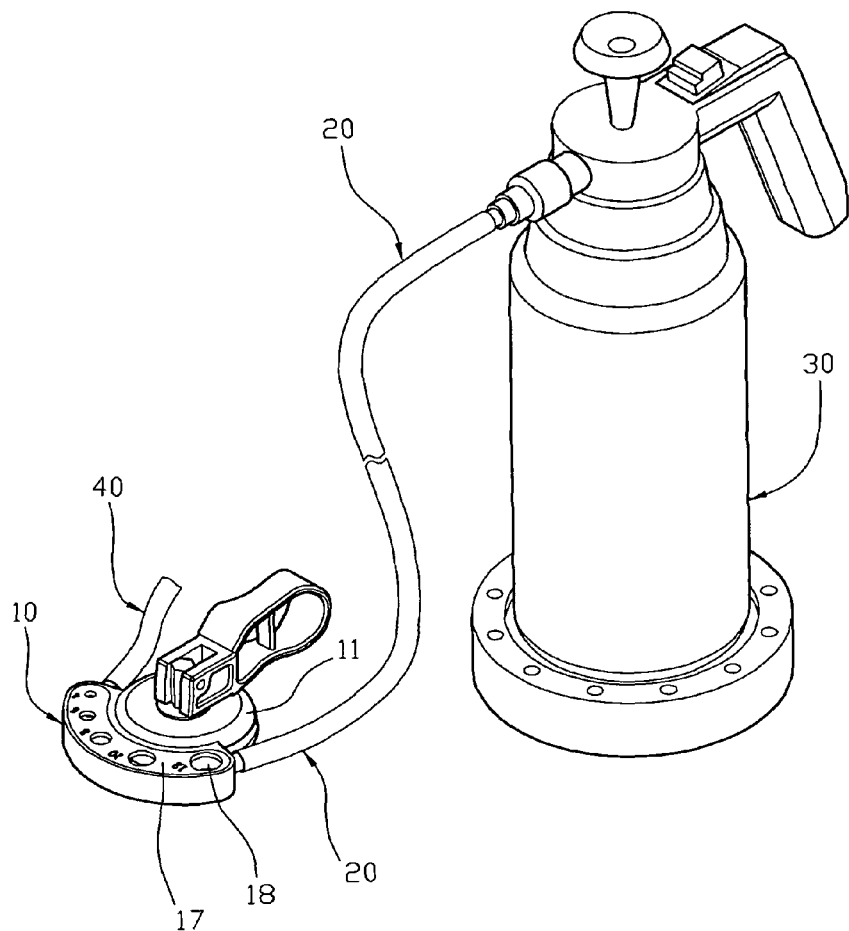
FIG. 1 is a perspective view of a locator in accordance with the preferred embodiment of the present invention.
Figure 2:
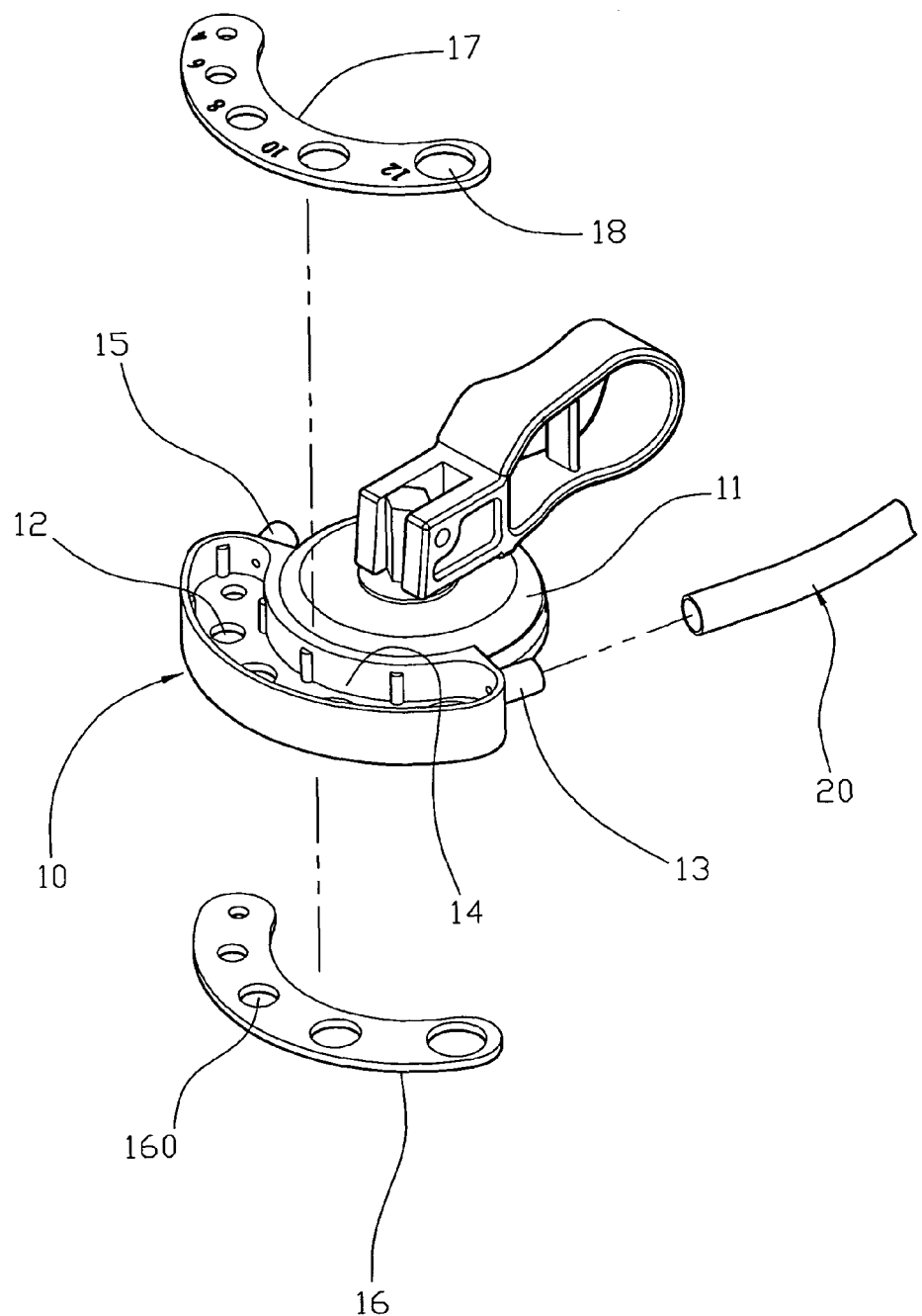
FIG. 2 is a partially exploded perspective view of the locator as shown in FIG. 1.
Figure 3:
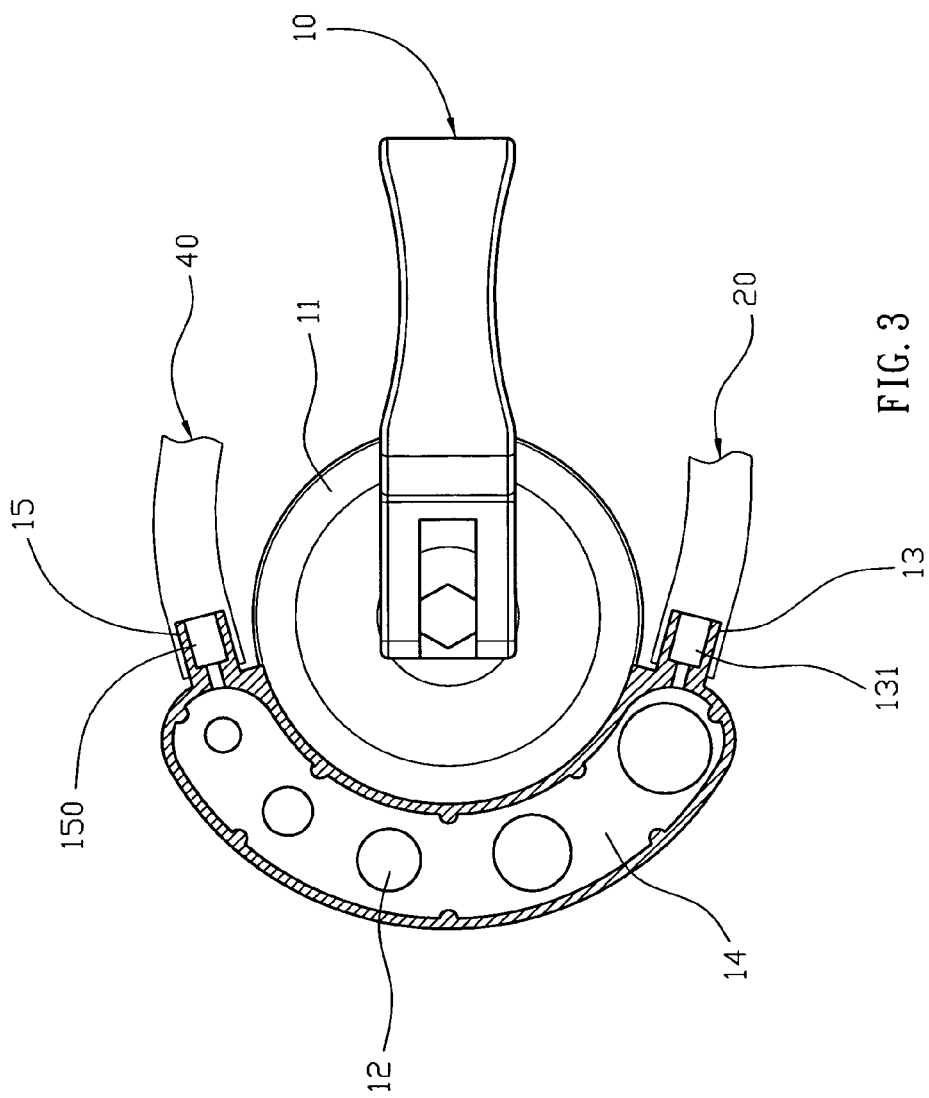
FIG. 3 is a partially top plan cross-sectional view of the locator as shown in FIG. 1.
Figure 4:
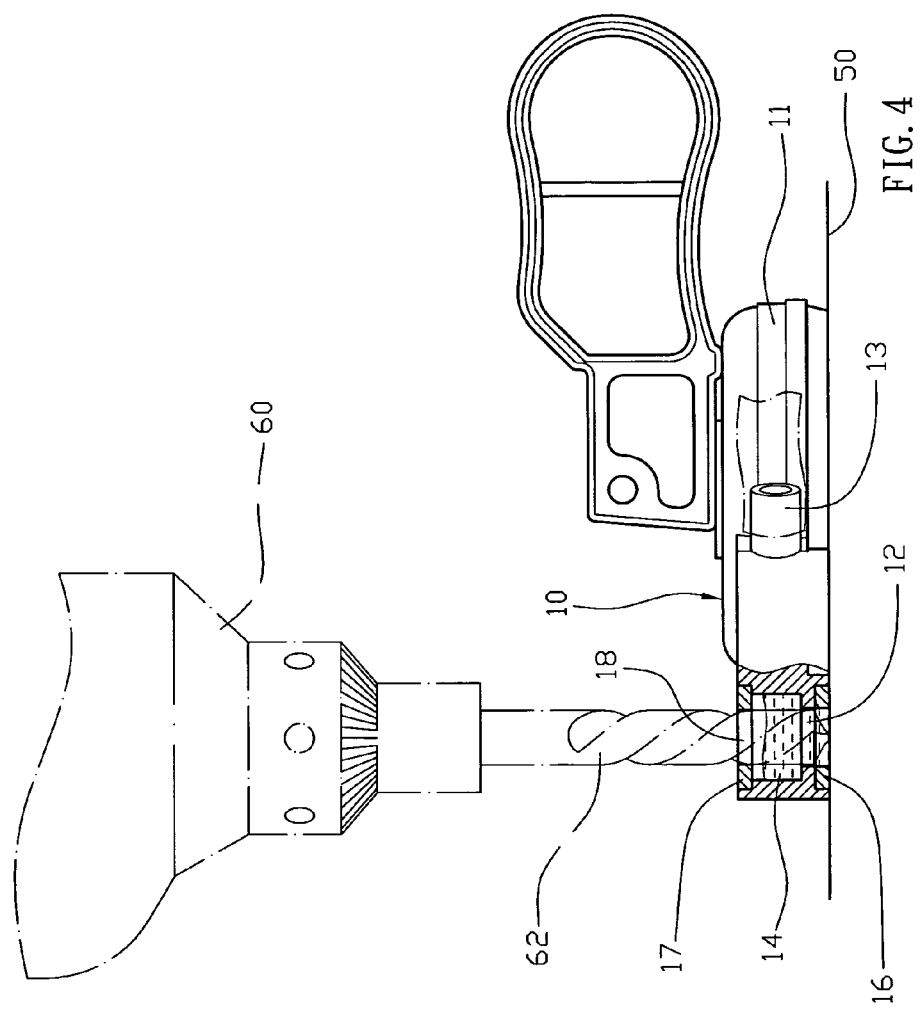
FIG. 4 is a partially side plan cross-sectional operational view of the locator as shown in FIG. 1.

Referring to the drawings and initially to FIGS. 1-4, a locator for a drilling tool in accordance with the preferred embodiment of the present invention comprises a main body 10 having a first side formed with at least one locating hole 12, an inlet connector 13 mounted on the main body 10 and connected to the locating hole 12 of the main body 10, an inlet pipe 20 having a first end connected to the inlet connector 13 and a second end connected to a container 30, an outlet connector 15 mounted on the main body 10 and connected to the locating hole 12 of the main body 10, an outlet pipe 40 connected to the outlet connector 15, a locating plate 17 mounted on a second side of the main body 10 and formed with at least one specification hole 18 aligning with the respective locating hole 12 of the main body 10, an anti-skid plate 16 mounted on the first side of the main body 10, and an attachment device 11 secured to the main body 10 to attach the main body 10 to a working face 50 (see FIG. 4).

The inlet connector 13 is mounted on and protruded from a first end of the main body 10 and has an inside formed with a stepped connecting hole 131 connected between the locating hole 12 of the main body 10 and the inlet pipe 20.

The outlet connector 15 is mounted on and protruded from a second end of the main body 10 and has an inside formed with a stepped connecting bore 150 connected between the locating hole 12 of the main body 10 and the outlet pipe 40.

The main body 10 has an inside formed with a receiving chamber 14 connected to the locating hole 12, the connecting hole 131 of the inlet connector 13, the connecting bore 150 of the outlet connector 15 and the specification hole 18 of the locating plate 17. The main body 10 has a substantially arc-shaped cross-sectional profile. The first side of the main body 10 has a closed wall defining the locating hole 12, and the second side of the main body 10 has an open wall to receive the locating plate 17. The receiving chamber 14 of the main body 10 is located between the inlet connector 13 and the outlet connector 15 and between the locating hole 12 and the specification hole 18 of the locating plate 17.

The specification hole 18 of the locating plate 17 has a diameter slightly smaller than that of the respective locating hole 12 of the main body 10.

The anti-skid plate 16 is located outside of the first side of the main body 10 and formed with at least one through hole 160 aligning with the respective locating hole 12 of the main body 10.

The container 30 contains a cooling agent which is filled through the inlet pipe 20 and the inlet connector 13 into the receiving chamber 14 of the main body 10 to pass through the locating hole 12 of the main body 10.

In operation, the main body 10 is attached to the working face 50 by the attachment device 11. Then, a drill bit 62 of a drilling tool 60 is extended through the specification hole 18 of the locating plate 17 and the respective locating hole 12 of the main body 10 to drill a hole in the working face 50 as shown in FIG. 4. At this time, the cooling agent of the container 30 is injected outwardly to pass through the inlet pipe 20 and the inlet connector 13 into the receiving chamber 14 and the locating hole 12 of the main body 10 to provide a cooling effect to the drill bit 62 of the drilling tool 60. In addition, the used cooling agent and the wasted chips produced during the drilling process are drained outwardly from the outlet connector 15 and the outlet pipe 40.

Figures 5, 6:
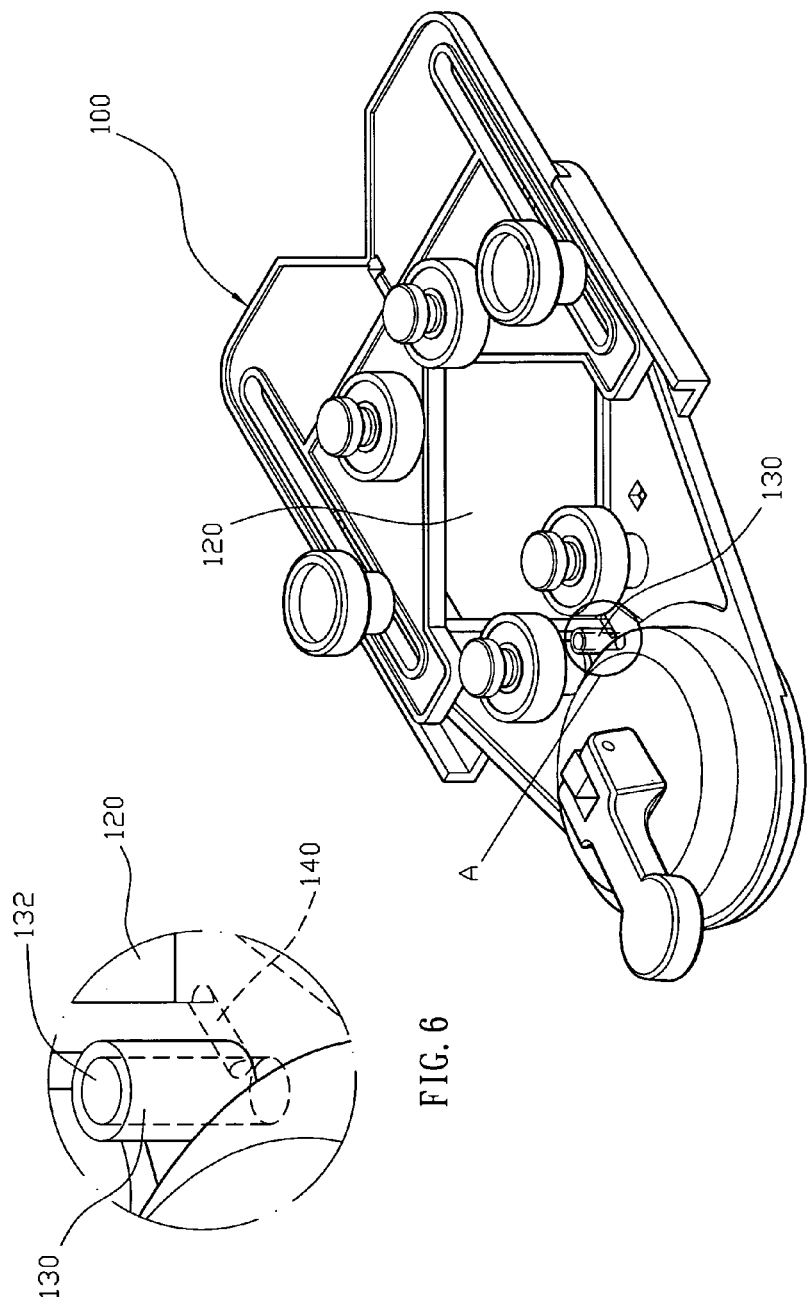
FIG. 5 is a perspective view of a locator in accordance with another preferred embodiment of the present invention.
FIG. 6 is a locally perspective enlarged view of the locator taken along a circle "A" as shown in FIG. 5.
Figure 7:
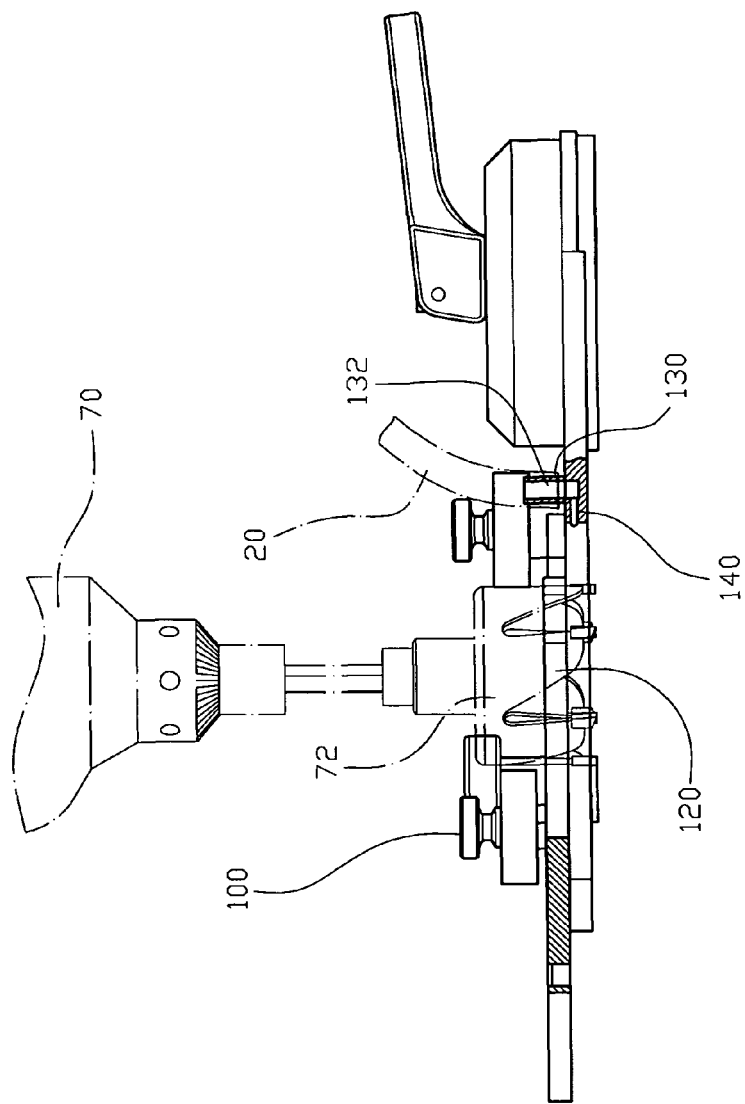
FIG. 7 is a side plan cross-sectional operational view of the locator as shown in FIG. 5.

Referring to FIGS. 5-7, the inlet connector 130 has an inside formed with a connecting hole 132 connected between the locating hole 120 of the main body 100 and the inlet pipe 20. The main body 100 has an inside formed with a connecting channel 140 connected between the locating hole 120 and the connecting hole 132 of the inlet connector 130. The locating hole 120 of the main body 100 has an adjustable size to fit that of a drill bit 72 of a drilling tool 70.

Accordingly, the cooling agent of the container 30 is injected outwardly to pass through the inlet pipe 20 and the inlet connector 13 into the locating hole 12 of the main body 10 to provide a cooling effect to the drill bit 62 of the drilling tool 60 automatically. In addition, the locator performs the cooling work automatically, so that the operator needs not to perform the drilling work by his one hand and to perform the cooling work by his other hand, thereby facilitating the operator operating the locator and protecting the operator's safety. Further, the locator can locate the drill bit 62 of the drilling tool 60 and perform the cooling work simultaneously, thereby facilitating the operator performing the drilling work.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A locator, comprising:
   a main body having a first side formed with at least one locating hole;
   an inlet connector mounted on the main body and directly connected to the locating hole of the main body;
   an inlet pipe having a first end connected to the inlet connector and a second end connected to a container;
   an outlet connector mounted on the main body and connected to the locating hole of the main body;
   an outlet pipe connected to the outlet connector;
   a locating plate mounted on a second side of the main body and formed with at least one specification hole aligning with the respective locating hole of the main body;
   an attachment device secured to the main body to attach the main body to a working face;
   wherein the inlet connector has an inside formed with a connecting hole connected between the locating hole of the main body and the inlet pipe;
   the outlet connector has an inside formed with a connecting bore connected between the locating hole of the main body and the outlet pipe;
   the inlet connector is mounted on and protruded from a first end of the main body;
   the outlet connector is mounted on and protruded from a second end of the main body;
   the first side of the main body has a closed wall defining the locating hole;
   the second side of the main body has an open wall to receive the locating plate;
   the locating plate is received in the open wall of the second side of the main body.

2. The locator in accordance with claim 1, further comprising an anti-skid plate mounted on the first side of the main body.

3. The locator in accordance with claim 2, wherein
   the anti-skid plate is located outside of the first side of the main body and formed with at least one through hole aligning with the respective locating hole of the main body;
   the locating hole of the main body is located between the respective through hole of the anti-skid plate and the respective specification hole of the locating plate.

4. The locator in accordance with claim 1, wherein the specification hole of the locating plate has a diameter slightly smaller than that of the respective locating hole of the main body.

5. The locator in accordance with claim 1, wherein
   the main body has an inside formed with a connecting channel connected between the locating hole and the connecting hole of the inlet connector;
   the inlet connector is disposed at an upright state;
   the connecting hole of the inlet connector is disposed at an upright state;
   the connecting channel of the main body is disposed at a transverse state.

6. The locator in accordance with claim 1, wherein the locating hole of the main body has an adjustable size.

7. The locator in accordance with claim 1, wherein the main body has an inside formed with an elongate receiving chamber connected to the locating hole.

8. The locator in accordance with claim 1, wherein
   the main body has an inside formed with a receiving chamber connected to the connecting hole of the inlet connector;
   the receiving chamber of the main body is located between the connecting hole of the inlet connector and the locating hole.

9. The locator in accordance with claim 1, wherein
   the main body has an inside formed with a receiving chamber connected to the connecting bore of the outlet connector;
   the receiving chamber of the main body is located between the connecting bore of the outlet connector and the locating hole.

10. The locator in accordance with claim 9, wherein the receiving chamber of the main body is located between the inlet connector and the outlet connector.

11. The locator in accordance with claim 1, wherein the main body has an inside formed with an elongate receiving chamber connected to the specification hole of the locating plate.

12. The locator in accordance with claim 11, wherein the receiving chamber of the main body is located between the locating hole of the main body and the specification hole of the locating plate and between the connecting hole of the inlet connector and the outlet connector and the locating hole.

* * * * *